United States Patent

Chang et al.

[11] Patent Number: 5,870,742
[45] Date of Patent: *Feb. 9, 1999

[54] METHOD AND APPARATUS FOR ENABLING PERSISTENT ATTRIBUTES IN AN OBJECT ORIENTED ENVIRONMENT

[75] Inventors: David Yu Chang, Austin; Robert Howard High, Jr.; Russell Lev Newcombe, both of Round Rock, all of Tex.

[73] Assignee: International Business Machines Corporation, Armonk, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 619,049

[22] Filed: Mar. 20, 1996

[51] Int. Cl.$^6$ .................................................. G06F 15/40
[52] U.S. Cl. .............................. 707/8; 707/10; 707/103; 707/1
[58] Field of Search .................................. 395/602, 608, 395/610, 614; 707/103, 8, 10, 2, 1

[56] References Cited

U.S. PATENT DOCUMENTS

| | | | |
|---|---|---|---|
| 5,241,624 | 8/1993 | Torres | 395/129 |
| 5,247,669 | 9/1993 | Anbraham et al. | 395/600 |
| 5,291,583 | 3/1994 | Bapat | 395/500 |
| 5,437,027 | 7/1995 | Bannon et al. | 395/600 |
| 5,448,727 | 9/1995 | Annevelink | 395/600 |
| 5,644,764 | 7/1997 | Johnson et al. | 395/614 |

FOREIGN PATENT DOCUMENTS 0 766 185   2/1997   European Pat. Off. .

OTHER PUBLICATIONS

Orthogonal Persistence in a Heterogeneous Distributed Object–Oriented Environment, P. Sousa et al., The Computer Journal, vol. 37 No. 6, 1994.

Persistent Objects in C++: Cooperation Among Classes Using a Persistent–Object Database, A. Stevens, Dr. Dobbs Journal, V 12 N 12 p34 (6); Dec. 1992.

*Primary Examiner*—Thomas G. Black
*Assistant Examiner*—Michael J. Wallace, Jr.
*Attorney, Agent, or Firm*—David A. Mims, Jr.

[57] ABSTRACT

A method and apparatus for saving and restoring persistent objects in a distributed object-oriented programming environment. This invention maintains persistent values for individual attributes and or instance variables. Attribute persistence is implemented using an interface that is inherited by any class that wants to have persistent attributes. The interface provides load_attribute and store_attribute methods that provide TypeCode based encoding and decoding. The methods provide improved performance by maintaining a cached copy of the encoded attribute and its TypeCode in memory in addition to the copy that exist in external storage. This allows the load_attribute method to return the attribute without having to access external storage. Performance is enhanced during the object restoration process by restoring only the attribute values currently needed instead of the entire object. In addition, the invention keeps the contents of external storage in synchronization with the internal objects state thus improving the data integrity of the distributed object-oriented programming environment. This is accomplished by saving attribute data whenever it is updated.

13 Claims, 12 Drawing Sheets

FIG. 16

METHOD AND APPARATUS FOR ENABLING PERSISTENT ATTRIBUTES IN AN OBJECT ORIENTED ENVIRONMENT

FIELD OF THE INVENTION

The present invention relates to data processing systems, and more particularly, to saving and restoring persistent objects in an object oriented programming environment.

1. Related Application

This application is related to Ser. No. 08/619,041, entitled Method and Apparatus for Enabling A Persistent Metastate for Objects in an Object Oriented Environment, which is incorporated herein by reference.

2. Background of the Invention

Object oriented programming has long been advanced as a solution for liberating programmers from the shackles of particular languages, tools, operating systems, address spaces, networks compilers or applications. Component standards are evolving for creating component infrastructures in object oriented programming languages which will allow a component, consisting of selected distributed objects, to exists on any network and communicate with other components across desk tops or enterprises. In a distributed object-oriented programming environment, many long lived persistent objects tend to be large grained (e.g., they contain a large number of attributes and instance data). Prior art object based persistence mechanisms normally save or restore the entire object state, to or from external storage at one time. This can be very costly when using large grained objects. Performance issues thus arise when the entire object state is saved or restored. In order to lessen the effect of these performance issues, applications are structured to minimize the number of times the object state is saved and restored. This creates data integrity problems related to the object's state. For example, in a system management environment where there are a large number of user objects that represent all of the users in a particular distributed domain, an application is required to display a list of these user objects (e.g., potentially hundreds or thousands) to a system administrator, along with the name of each user. From that list, the system administrator selects a small number of user objects to interact with. If the entire state of each of the hundreds or thousands of user objects must be restored as each is reactivated (e.g., to enable the administrator to obtain the name of each), this introduces a performance problem where a tremendous amount of data that will not be used is restored.

Data integrity issues are introduced by attempts to alleviate the performance problems when using traditional prior art object based persistence mechanisms. The current state of an object is only written to external storage when requested by an application or by some internal event within the object itself. This is not normally done whenever the state of the object changes, but is usually done only after some very significant update to the object or when the object environment is going down cleanly, and the objects are asked to save themselves. Because of this, the internal state of the object, and the state of the object as represented on external storage tends to diverge over time. In the case where the object environment goes down in an abnormal manner, the persistent object does not get a chance to save itself and the current state of the object is lost.

It is therefore desirable to have a method and apparatus for improving the performance and enhancing the data integrity of persistent objects in distributed object-oriented programming environments.

SUMMARY OF THE INVENTION

This invention relates to a method and apparatus for saving and restoring persistent objects in a distributed object-oriented programming environment. The invention maintains persistent values for individual attributes and or instance variables. Attribute persistence is implemented using an interface that is inherited by any class that wants to have persistent attributes. The interface provides load_attribute and store_attribute methods. The methods access functions that provide TypeCode based encoding and decoding. In the Common Object Request Broker Architecture (CORBA) implementation, the TypeCode defines the type of the attribute, be it a standard type or a user defined type. To encode an attribute, the TypeCode information lets the function know how to flatten the data so that it can be written to external storage. In order to decode an attribute, the TypeCode information lets the function know how to restore the internal data from the flattened data read from external storage. The methods provide improved performance by maintaining a cached copy of the encoded attribute and its TypeCode in memory in addition to the copy that exists in external storage. This allows the load_attribute method to return the attribute without having to access external storage.

In addition, the invention keeps the contents of external storage in synchronization with the internal object state thus improving the data integrity of the distributed object-oriented programming environment. This is accomplished by saving attribute data whenever it is updated. Performance is enhanced during the object restoration process by restoring only the attribute value currently needed.

DETAILED DESCRIPTION OF THE EMBODIMENTS

This invention provides a method and apparatus for enhancing the performance and improving the data integrity of large grained persistent objects in a distributed object-oriented programming environment. For the purpose of the invention, a persistent object is an object whose attribute (state) data is kept in persistent storage and can therefore be restored to its latest state if the in-memory object is lost (e.g., such as when the server terminates and restarts). Persistent data objects tend to be large grained (e.g., containing a large number of attributes and instance data). Object based persistence mechanisms in the prior art normally save or restore the entire object state to or from external storage at one time. From a performance viewpoint, this becomes very costly when large grained persistent objects are saved or restored.

Figure 1:
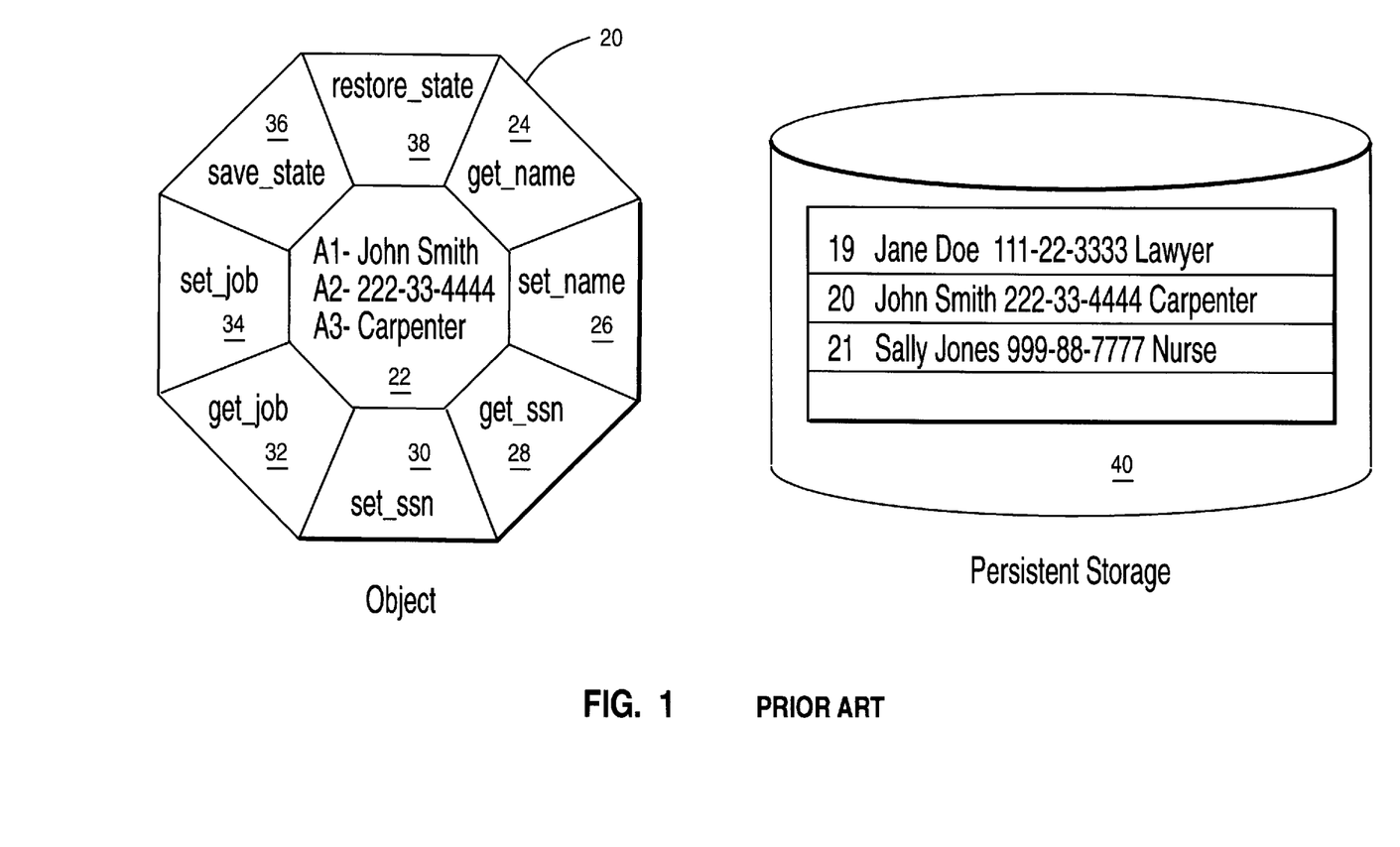
FIG. 1 is a block diagram for storing a prior art persistent object using an object persistence model.

Turning now to FIG. 1, there is shown the prior art approach to saving an object state on persistent storage using object persistence. An object 20, is shown in memory containing attributes 22, and methods 24–38. The attributes 22, consist of A1 (the name), A2 (the social security number) and A3 (the profession). Object 20, has methods 24–34, that get and set each of the attributes 22, in a manner well known in the art. Object 20, also has methods which are used to save (save_state 36) or restore (restore_state 38) its state. On persistent storage 40, the state data for several objects is being stored. It can be seen that the state data for objects 19, 20 and 21 is stored for each object as a single stream of data which contains the values for all of the objects attributes. This data on persistent storage 40, is only updated when the save_state 36 method is executed.

Figure 2:
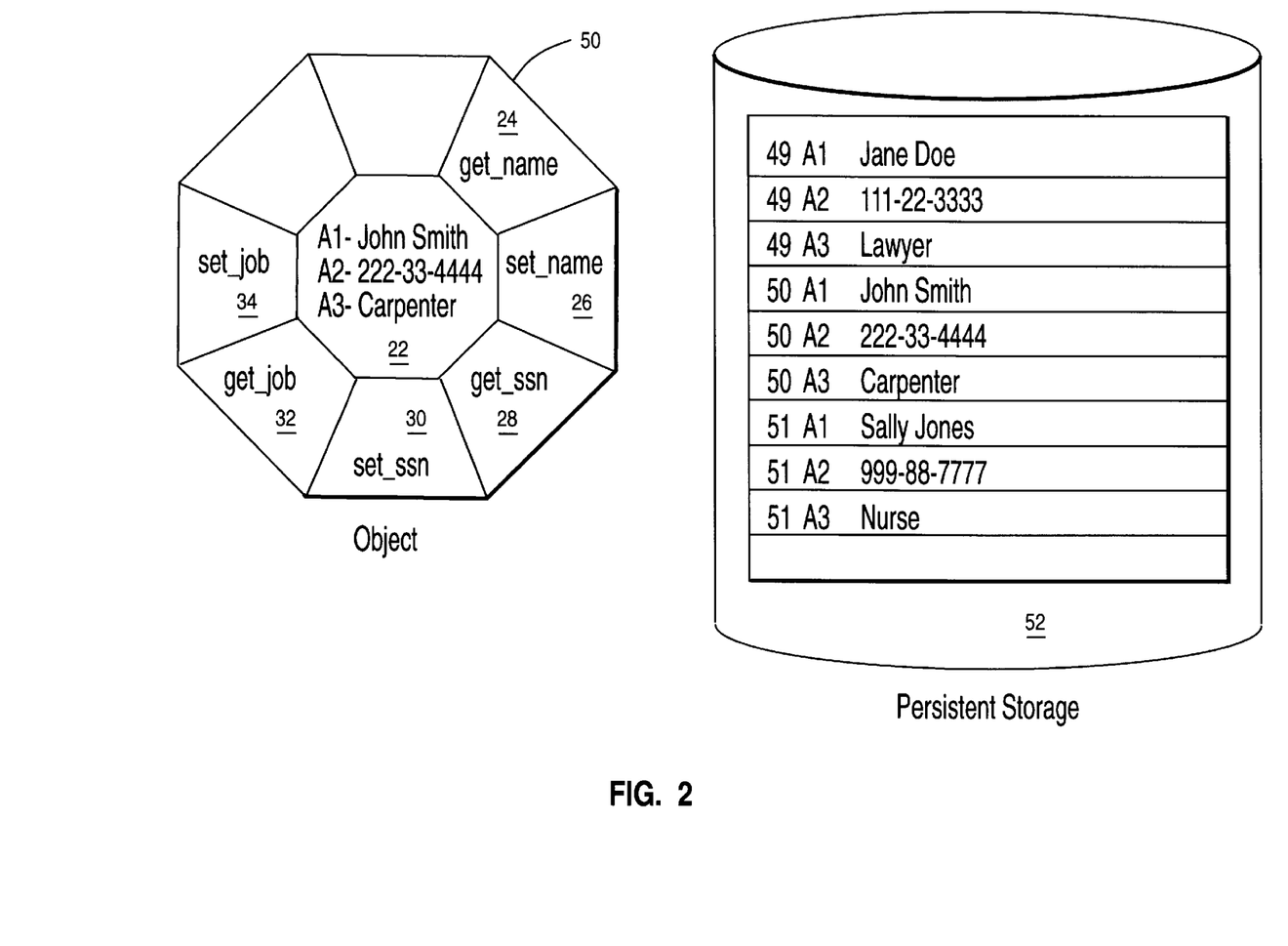
FIG. 2 is a block diagram for storing a persistent object using the attribute persistence model of this invention.

Referring now to FIG. 2, there is shown an attribute persistence approach to saving object state on persistent storage using this invention. An object 50, is shown in memory containing attributes 22, and methods 24–34, that get and set each of the attributes 22. Object 50, like the prior art object of FIG. 1, contains three attributes, A1, A2, and A3. Similar to prior art object 20 of FIG. 1, the attributes 22, of object 50 are also stored on persistent storage. However, unlike the attributes 22, of the prior art object 20, which stores its attributes 22, on persistent storage 40, as a single entry for each object, this invention stores the attributes 22, as multiple independent entries in persistent storage 52. Object 50, of this invention, does not contain the methods for saving (save_state 34) and restoring (restore_state 36) the object as shown for the prior art object 20. One skilled in the art will appreciate that the attributes 22, stored on persistent storage 40, for object 20, in the prior art implementation are organized as one combined stream of data per object. One skilled in the art will also appreciate that in this invention, the attributes 22, for object 50, are stored on persistent storage 52, on an object/attribute basis. This data for an object/attribute on persistent storage 52 is updated whenever the corresponding set method is executed.

Figure 3:
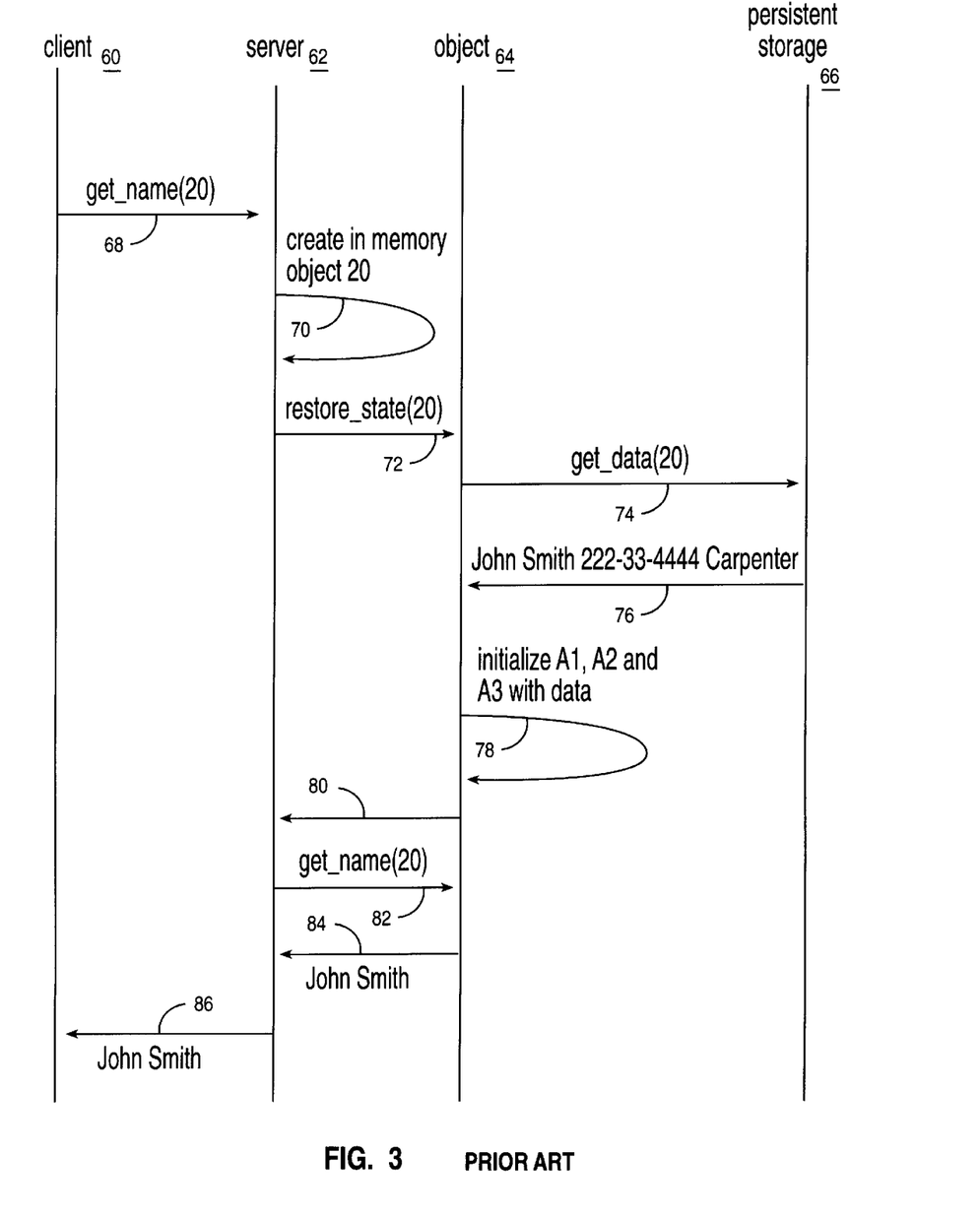
FIG. 3 is an interaction diagram for accessing an attribute from an object that must be restored in a prior art object persistence model.

Referring now to FIG. 3, an interaction diagram is shown for the prior art approach for accessing a persistent object's attribute when the object needs to be restored in memory. A client 60, invokes the method get_name on object 20 (64), as shown in step 68. A server 62, which manages object 20 (64), determines that the object is not currently in memory and creates a new in-memory object for object 20 (64), as shown in step 70. At step 72, the server 62, invokes the method restore_state. This causes object 20 (64), to get all of its state data from persistent storage 66, as shown in steps 74–76, and use it to initialize all of its attributes, as shown in step 78. At step 80, the procedure returns to server 62. The original get_name invocation is passed to object 20 (64), as shown in step 82, and the data for the name attribute is returned in step 84. The server 62, then passes the requested information back to the client 60, as shown in step 86.

Figure 4:
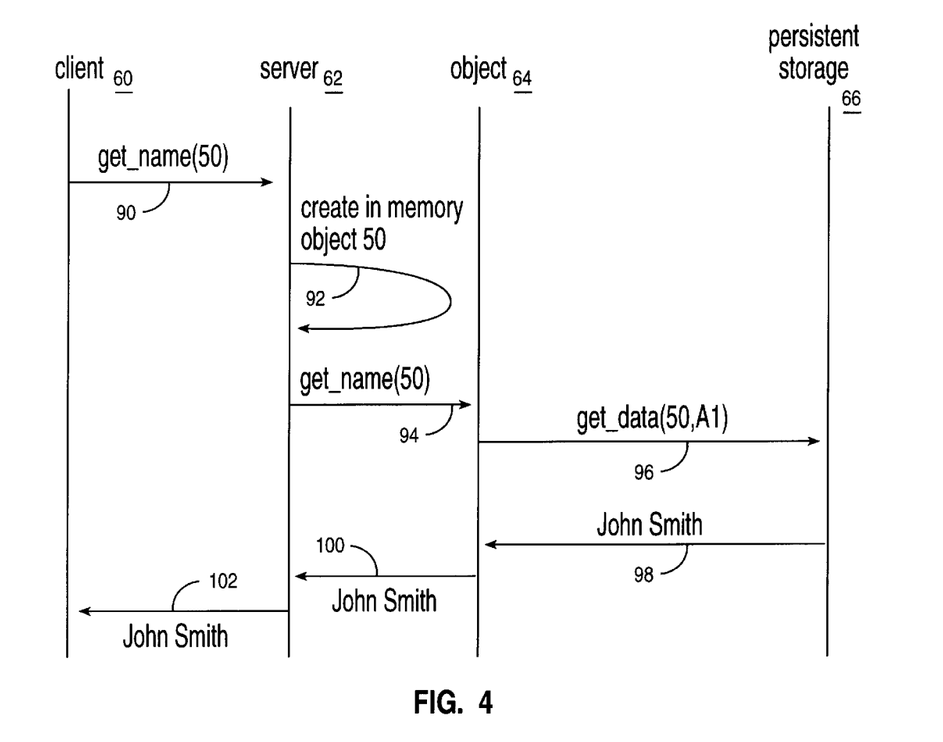
FIG. 4 is an interaction diagram for accessing an attribute from an object that must be restored using the attribute persistence model of this invention.

Referring now to FIG. 4, accessing a persistent object's attribute when the object needs to be restored in memory is depicted for the attribute persistence approach of this invention. Client 60, invokes get_name on object 50 (64), as shown in step 90. The server 62, which manages object 50 (64), determines that it is not currently in memory. Server 62, creates a new in-memory object 50 (64), as shown in step 92. The original get_name invocation is passed to object 50 (64), as shown in step 94. Object 50 (64), determines that the value for the name attribute must be accessed from persistent storage 66, and retrieves the data as shown in steps 96–98, and returns the name to the server 62, as shown in step 100. Server 62, passes the information back to the original client 60, as shown in step 102.

One skilled in the art can appreciate the performance enhancement of this invention, when there is a need to display a list of names from many objects from which a user would select only one object for further interaction. The complete list of attributes for each object is retrieved from persistent storage 66, as illustrated in FIG. 3, steps 74–78, of the prior art object persistence model, while the attribute persistence model of this invention allows the return of the single attribute value required as shown in FIG. 4, steps 96 and 98. The performance enhancements can be seen more clearly using the following example. Assume the existence of a collection object that contains object references to all of the employees for a company with one-thousand employees. Assume also that each employee object contains over one hundred data elements (attributes) for each employee. A human resources employee needs a list of all employees displayed so that specific employees can be selected. If none of the employee objects are currently in memory, the prior art object persistence mechanism would require the restoration of over one hundred thousand data elements (attributes) in order to generate the list of employees. In contrast, the attribute persistence mechanism of this invention needs to restore only one thousand data elements (attributes) to generate the list of employees.

Figure 5:
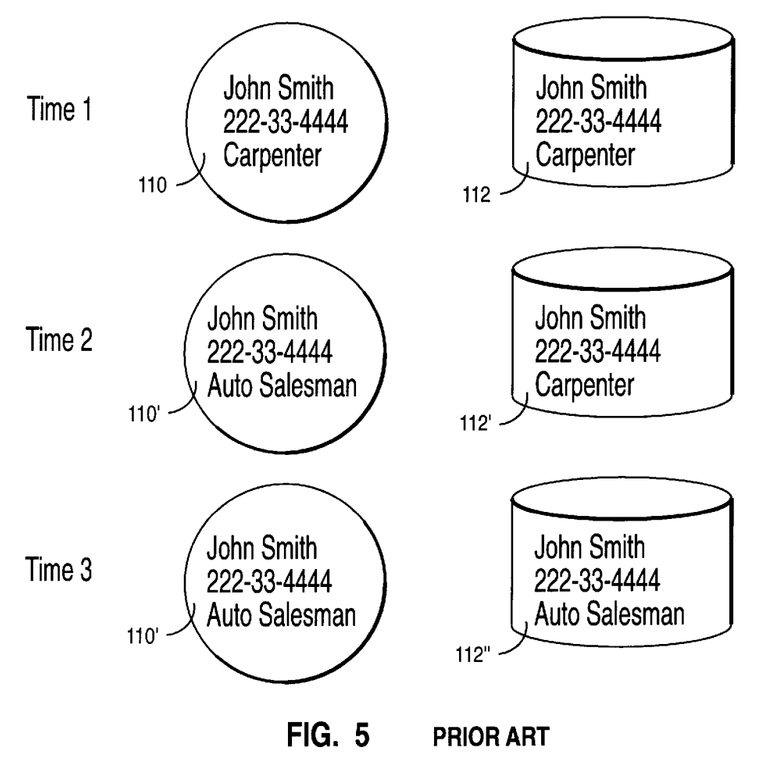
FIG. 5 is a block diagram showing the prior art operations for updating an attribute using the object persistence model.

Referring now to FIG. 5, a block diagram is shown for the operations required to update an object using the prior art object persistence model. The prior art uses the set_job method to update the attribute. At Time 1, memory 110, contains the object's state, which is the same as that shown in persistent storage 112. Time 2, represents the state of the memory and persistent storage after executing the set_job method. At Time 2, the memory 110', has been updated from "Carpenter" to "Auto Salesman", but the persistent storage 112', has not changed. At Time 3, the save_state method is executed. At this time, the object writes its entire state from memory 110', to persistent storage 112", and the two are now in synchronization (sync). As appreciated by one skilled in the art, an abnormal termination of the server which manages the object after Time 2 and before Time 3, will result in the memory 110' updates being lost.

Figure 6:
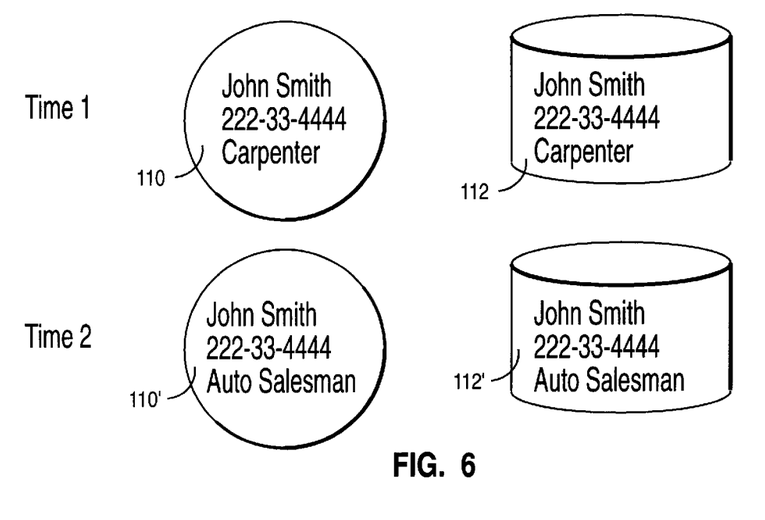
FIG. 6 is a block diagram showing the operations for updating an attribute using the attribute persistence model of this invention.

Referring now to FIG. 6, there is shown the operation for updating an attribute using the attribute persistence model of this invention. Time 1, shows the memory 110, in sync with persistent storage 112, with the in-memory contents of the object state being the same as those in persistent storage 112. Time 2, shows what happens when the set_job method is executed. Both the memory 110', and the persistent storage 112', are updated from "Carpenter" to "Auto Salesman", so that the two remain in sync. One skilled in the art can appreciate that if an abnormal termination occurs (e.g., server crashes) after Time 2, the memory state 110', is not lost, because when the object is restored, it will be restored to the value in persistent storage 112'. Returning to FIG. 5, if an abnormal termination (e.g., server crashes) occurs after Time 2, but prior to Time 3, for the prior art persistence model, the memory state 110', containing the update from "Carpenter" to "Salesman" is lost, because restoration of the object will result in persistent storage 112', being restored containing the attribute "Carpenter". One solution for the prior art persistence model is to always execute a save_state when an attribute is updated. However, this can lead to performance problems. For example, if employee objects, containing over one hundred attributes for each employee, were saved using this approach, this would result in one hundred attributes being written to persistent storage whenever a single data element (attribute) is updated. Because of this, the typical approach in the prior art persistence model is to only update the persistent storage when some large number of updates have been made to the object, or when the server is going down cleanly and has the opportunity to tell the object to save its state prior to termination.

Figure 7:
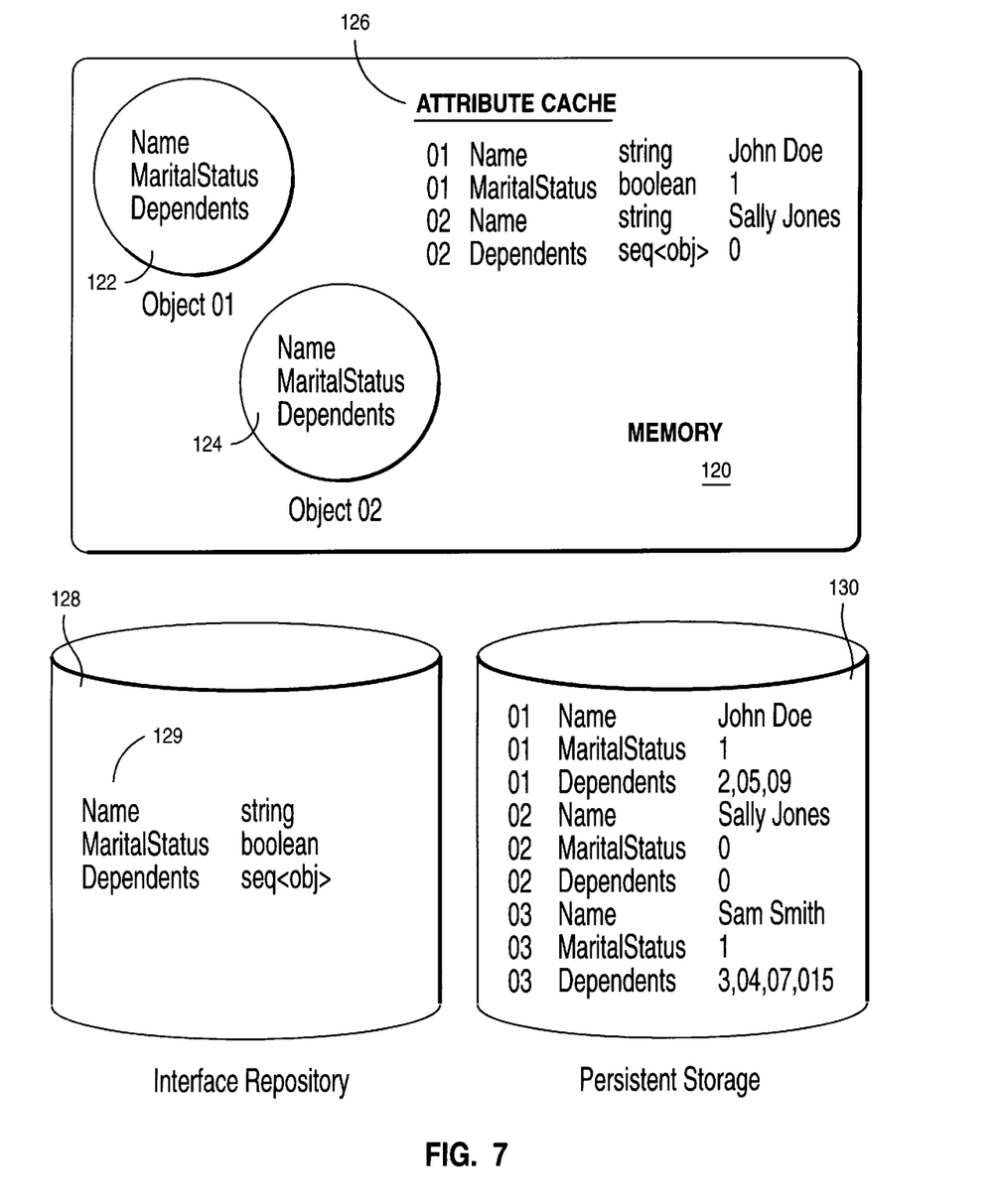
FIG. 7 is a block diagram of the major components of the attribute persistence model of this invention.

Referring now to FIG. 7, there is shown a block diagram of the attribute persistence model. Memory 120, contains object O1 122, and object O2 124. The attribute cache 126, contains data related to objects O1 122, and O2 124. An interface repository 128, contains information which defines the TypeCodes for each of the attributes (e.g., attribute Dependents is a sequence of objects). Persistent storage 130, contains the data related to all of the attributes for all of the objects. There are some important points to notice about this model. First, it can be seen that not all of the objects that exist in memory 120, have all of their attributes in memory in the attribute cache 126. For example, object O1 (122) does not currently have the data for its Dependents attribute in memory 120. However, this data is in persistent storage 130, showing that Dependents for object O1 (122), consists of two objects (objects O5 and O9). Second, not all objects in the persistent storage 130, exist in memory 120 (e.g., object O3).

Figure 8:
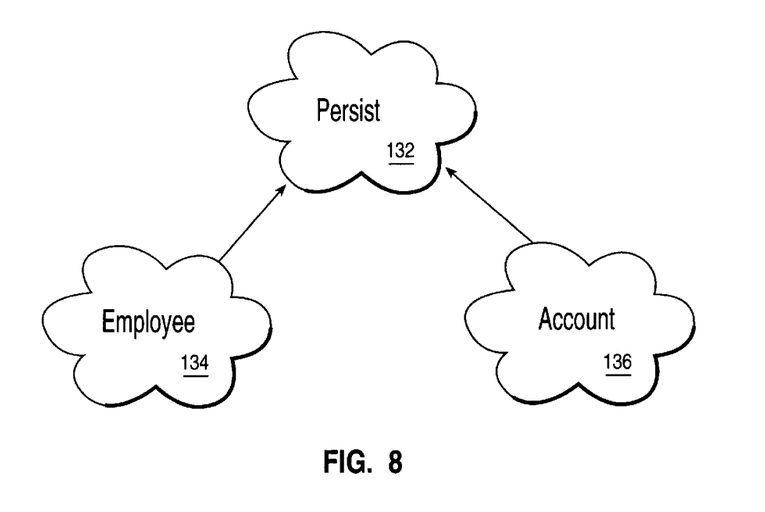
FIG. 8 is a diagram using Booch notation showing inheritance relationships for attribute level persistence.

With reference now on FIG. 8, there is shown a diagram in Booch notation showing the inheritance relationship between the Persist interface and interfaces that need attribute level persistence (e.g., Employee, Account). The Employee class 134, and Account class 136, inherit the persistence interface implemented by the Persist class 132. The preferred embodiment of the Persist interface is shown below using CORBA Interface Definition Language (IDL):

Interface Persist { void load_attribute(in string attribute_name,
     out void* buffer
     in TypeCode attribute_tc);

void store_attribute(in string attribute_name,
     in void* buffer,
     in TypeCode attribute_tc);

}

This interface is inherited by any class (e.g., Employee 134 and Account 136) that wants to have persistent attributes. The interface discloses two methods. The load_attribute method decodes and returns the value for the requested attribute from the cache, or from persistent storage if not in the cache. The store_attribute method encodes and stores in the cache and the database the value of the attribute passed in, along with its TypeCode. One skilled in the art will appreciate that the load_attribute and store_attribute methods need access to a function that provides TypeCode based encoding and decoding. In the preferred embodiment, the invention utilizes the TypeCode present in a Common Object Request Broker Architecture (CORBA) implementation. The TypeCode defines the type of attribute, be it a standard type or a user defined type. In order to encode an attribute, the TypeCode information lets the function know how to flatten the data so that it can be written to external storage. Likewise, to decode an attribute, the TypeCode information lets the function know how to restore the internal data from the flattened data read from external storage.

The enhanced performance of this invention is possible by maintaining a cached copy of the encoded attribute and its TypeCode in memory, in addition to the copy that exists in persistent storage. This allows the load_attribute method to return the attribute without having to access persistent storage. In a CORBA environment, load_attribute and store_attribute invocation are typically encapsulated in the _get and _set methods associated with an attribute. For example, the "name" attribute will have _get_name and _set_name methods. In this invention, the leading _ is normally not shown, and the term "attr" is used to mean "an attribute" rather than a specific attribute such as "name"). In a non-CORBA environment, the methods can be encapsulated within any methods provided for the accessing and setting of attributes and/or instance data. The encapsulation of these calls accomplishes two purposes:

The program interfacing with the Persist object does not have to be aware of the persistence, and can code simpler methods in their code such as:
     a=_get_attr();
     _set_attr(a);
   The signature of these methods contains a void* for the buffer parameter. In a distributed environment, this parameter cannot be marshalled for a remote call. Therefore, encapsulating the load_attribute and store_attribute from within another method on the same object is required to guarantee that they are only called locally rather than remotely.

In the CORBA environment, the TypeCode for an attribute is accessible from the Interface Repository. Depending upon a particular Object Request Broker (ORB) implementation of the Interface Repository, a significant performance penalty results when the attributes are accessed. In the methods of the invention, the TypeCode for the attribute can optionally be passed on the call, which provides two capabilities. First, if the TypeCode is not passed and the attribute is not already in the cache, the method must access the Interface Repository to get the attributes type. However, if the TypeCode is passed, the expensive performance call to the Interface Repository is eliminated. Second, instance data that is not declared in the Interface Definition Language (IDL) as an attribute can be saved using Attribute Persistence. In this case, there is no _get and _set method, but typically an equivalent operation is introduced directly in the IDL (e.g., get_my_instance_var). This approach is also taken in non-CORBA environments which only support instance data and do not have the concept of a specifically defined attribute.

Figure 9:
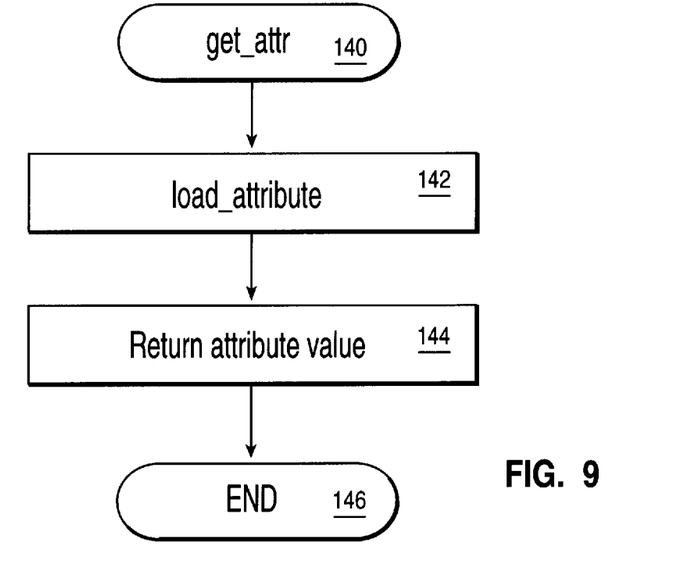
FIGS. 9 and 10 show the flow diagram/interaction diagram for the load_attribute method of the invention.
Figure 10:
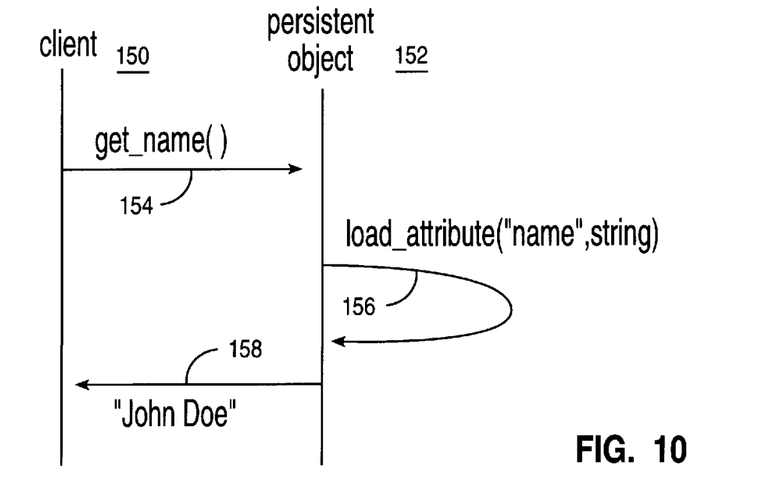

Referring now to FIG. 9, there is shown a flow diagram that depicts the use of the load_attribute method. A get_attr() method, where "attr" represents the name of some attribute, is started at block 140. The get_attr() method invokes the load_attribute method at block 142, which accesses and returns the attribute data from the cache or persistent storage. The get_attro method then returns the attribute data to the caller at block 144 and terminates at 146. With reference now on FIG. 10, an interaction diagram that depicts the use of the load_attribute method is presented. A client 150, invokes get_name at step 154 to persistent object 152. The persistent object 152, invokes the load_attribute method using the input ("name", string) at step 156. This tells load_attribute to load the "name" attribute and that it is of type string. Persistent object 152, returns the requested name, "John Doe", to client 150, at step 158.

Figure 11:
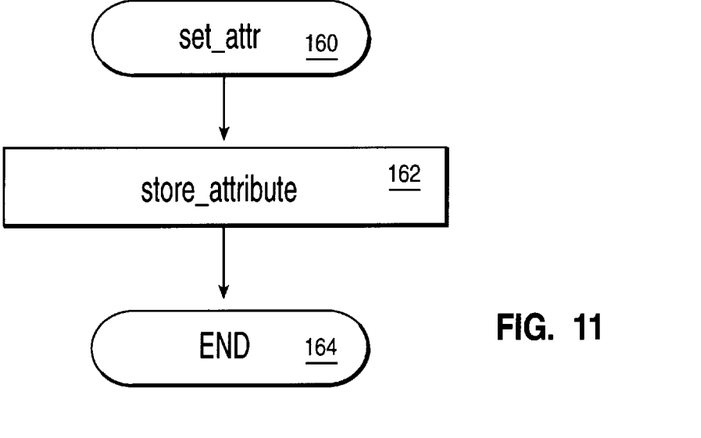
FIGS. 11 and 12 show the flow diagram/interaction diagram for the use of the store_attribute method of the invention.
Figure 12:
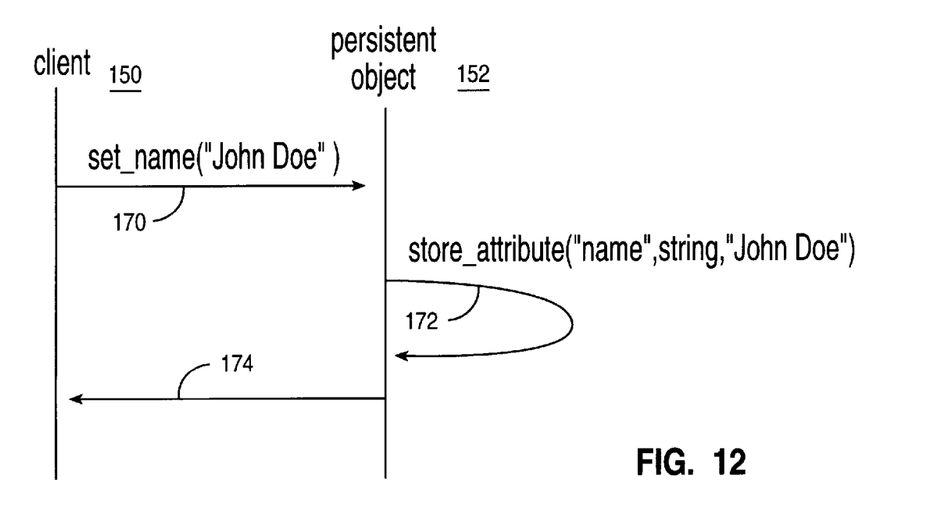

Referring now to FIG. 11, there is shown a flow diagram that depicts the use of the store_attribute method of the of the invention. A set attr() method is started at block 160. The set_attr method invokes the store_attribute method at block 162, which stores the attribute data in the attribute cache and persistent storage. The set_attr() method then terminates at block 164. With reference now on FIG. 12, an interaction diagram that depicts the use of the store_attribute method passing the data is shown. A client 150, invokes set_name passing the data "John Doe" at step 170. The persistent object 152, invokes store_attribute as shown in step 172, using ("name", string, "John Doe"). This tells store_attribute to save "John Doe" as the value of the "name" attribute and that it is at type string. At step 174, the persistent object 152, returns control to client 150, after completing the operation.

Figure 13:
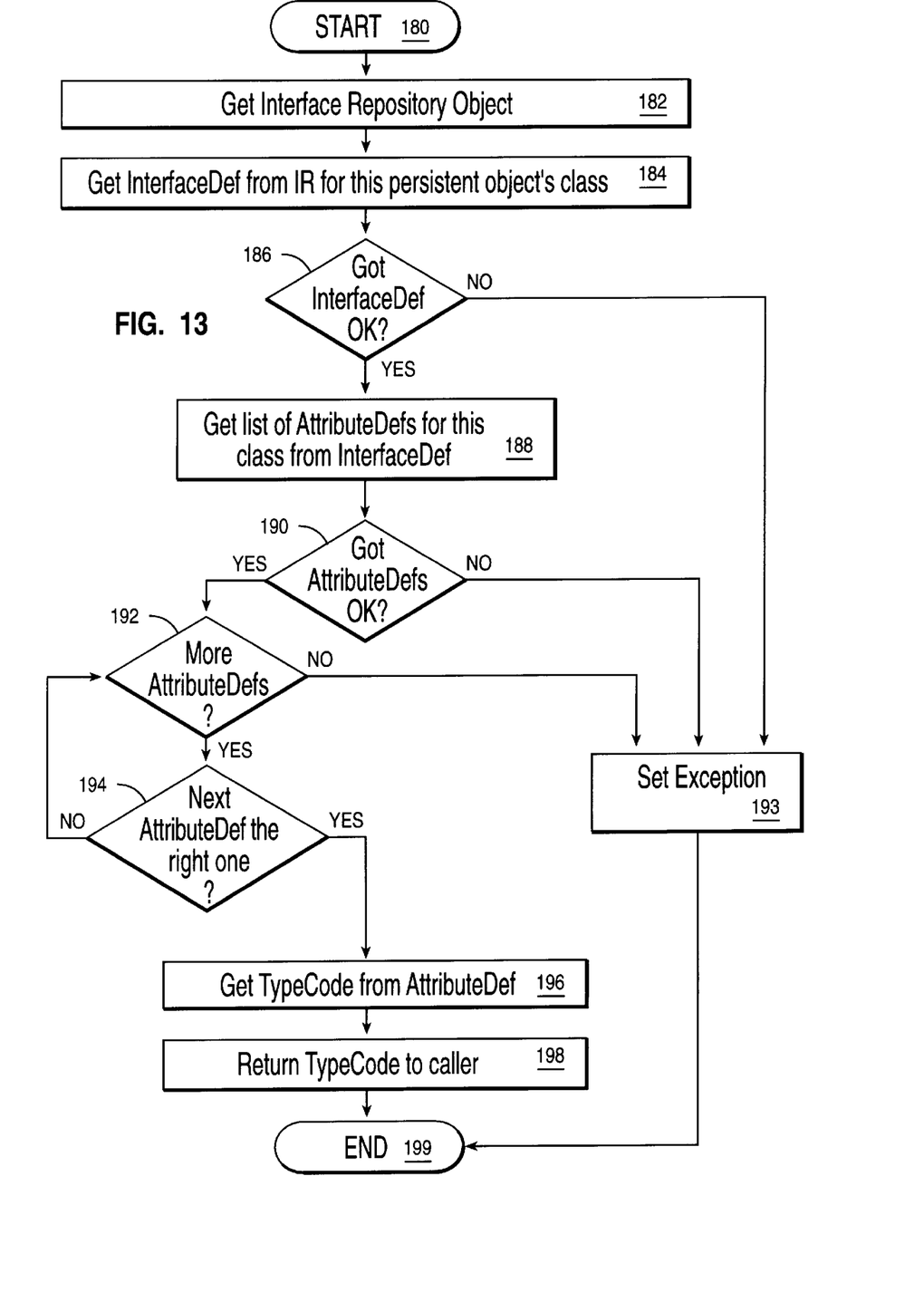
FIG. 13 is a flow diagram for accessing the Typecode using the methods of the invention.

Turning now to FIG. 13, a flow diagram is shown describing how the methods of this invention obtain access to the TypeCode for an attribute in the CORBA environment. The procedure starts at block 180, and moves immediately to block 182, where access to the Interface Repository object is obtained. At block 184, the procedure gets the InterfaceDef for this persistent object class from the Interface Repository. A check is performed at block 186, to determine if the InterfaceDef was successfully obtained. If NO, at block 193, the procedure sets exception and ends at block 199. If YES, at block 188, the procedure gets a list for the class from the InterfaceDef. At block 190, a check is performed to determine if the Attribute Defs were obtained successfully. If NO, the procedure sets exception at block 193, and ends at block 199. If YES, a loop is entered to search for the Attribute Def describing the attribute whose TypeCode is needed. Starting at block 192, a check is carried out to determine if there are more Attribute Defs to check. If NO, at block 193, the procedure sets an exception, and ends. If YES, the procedure checks at block 194 to see if the next Attribute Def is the one requested. If NO, the procedure returns to block 192. Else, at block 196, the procedure gets the TypeCode from the Attribute Def and returns the TypeCode to the caller at block 198 and ends at block 199.

Figure 14:
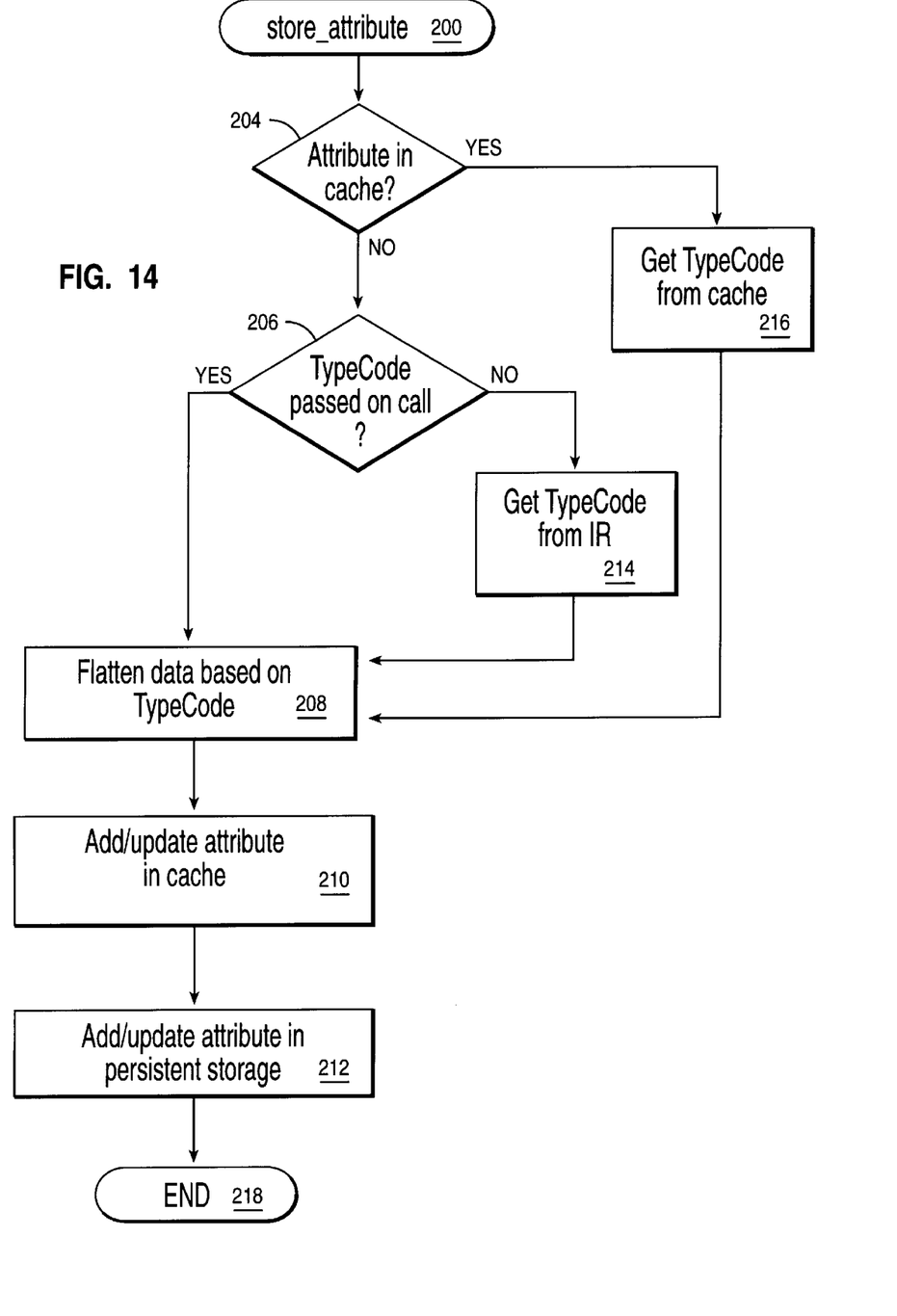
FIG. 14 is a flow diagram for storing attributes using the invention.

Turning now to FIG. 14, a flow diagram is shown for the store_attribute method of the invention. The procedure starts at block 200, and proceeds to block 204, where a check is performed to see if the attribute is in the cache. If YES, the procedure obtains the TypeCode from the cache at block 216, and proceeds to block 208. If NO, at block 206, a check is performed to determine if the TypeCode was passed on the call. If NO, the procedure gets the TypeCode from the Interface Repository at block 214, and control proceeds to block 208. If YES, the procedure continues to block 208, where it flattens the data based on the TypeCode. It then proceeds to add (or update) the attribute in the cache per block 210. At block 212, the procedure adds or updates the attribute in the persistent storage and ends at block 218.

Figure 15:
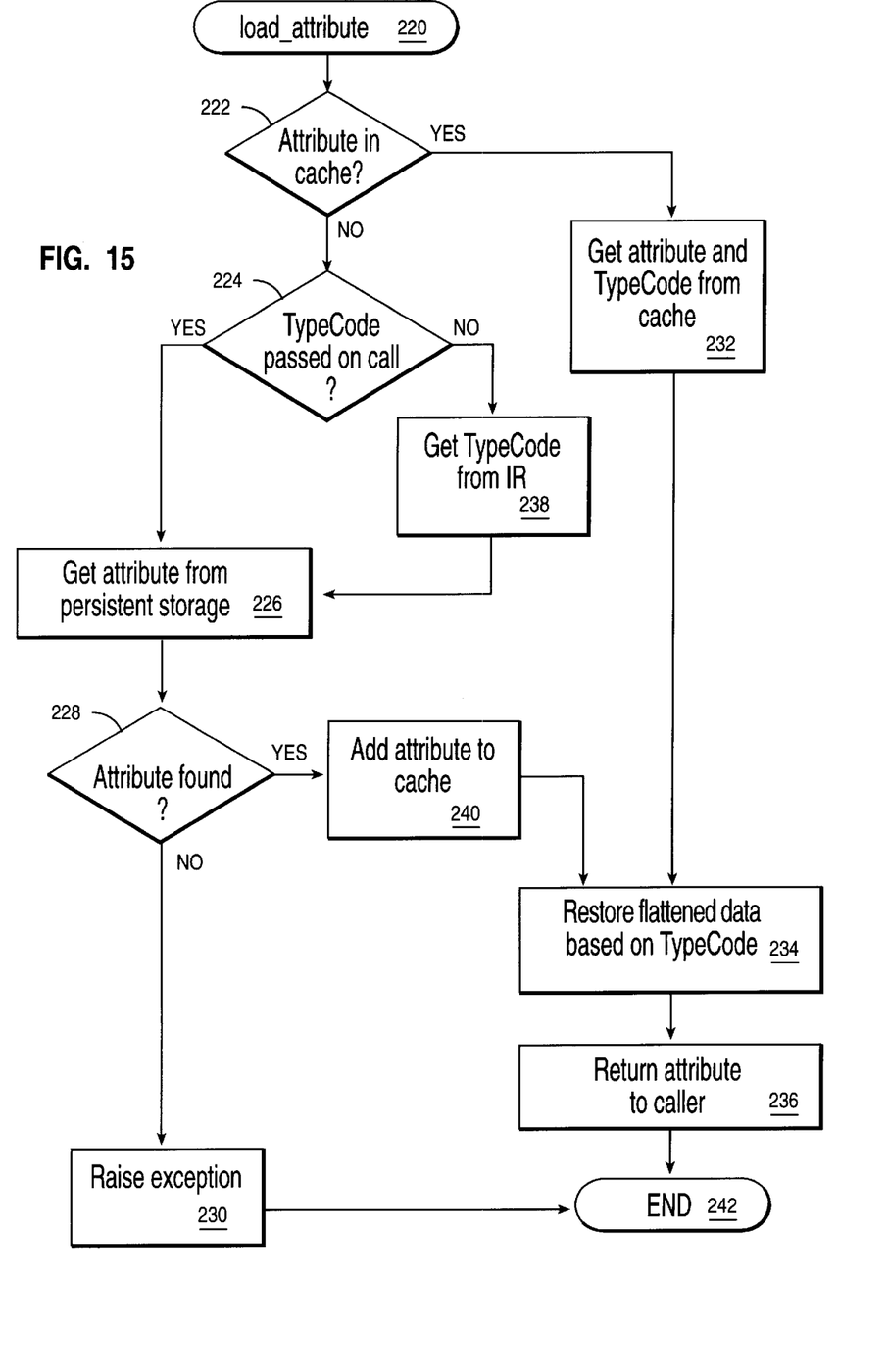
FIG. 15 is a flow diagram for loading attributes using the invention.

Referring now to FIG. 15, a flow diagram is shown for the load_attribute method of the invention. The procedure starts at block 220, and proceeds to block 222, where a check is conducted to determine if an attribute is in the attribute cache. If NO, at block 224, the procedure checks to see if the Typecode was passed on the call. If NO, at block 238, the procedure obtains the Typecode from the Interface Repository, and proceeds to block 226. If YES, the procedure continues to block 226, where it obtains the attribute from persistent storage. At block 228, the procedure checks to determine if the attribute was found. If YES, the attribute is added to the attribute cache at block 240, and the procedure restores the flattened data based on the Typecode as shown in block 234. At block 236, the procedure returns the attribute to the caller and ends at block 242. Returning to block 228, if the attribute is not found, the procedure raises an exception at block 230, and ends at block 242. Returning to block 222, if the attribute was in the cache, the procedure gets the attribute and TypeCode from the cache and proceeds to block 234, where the procedure continues as described above.

Figure 16:
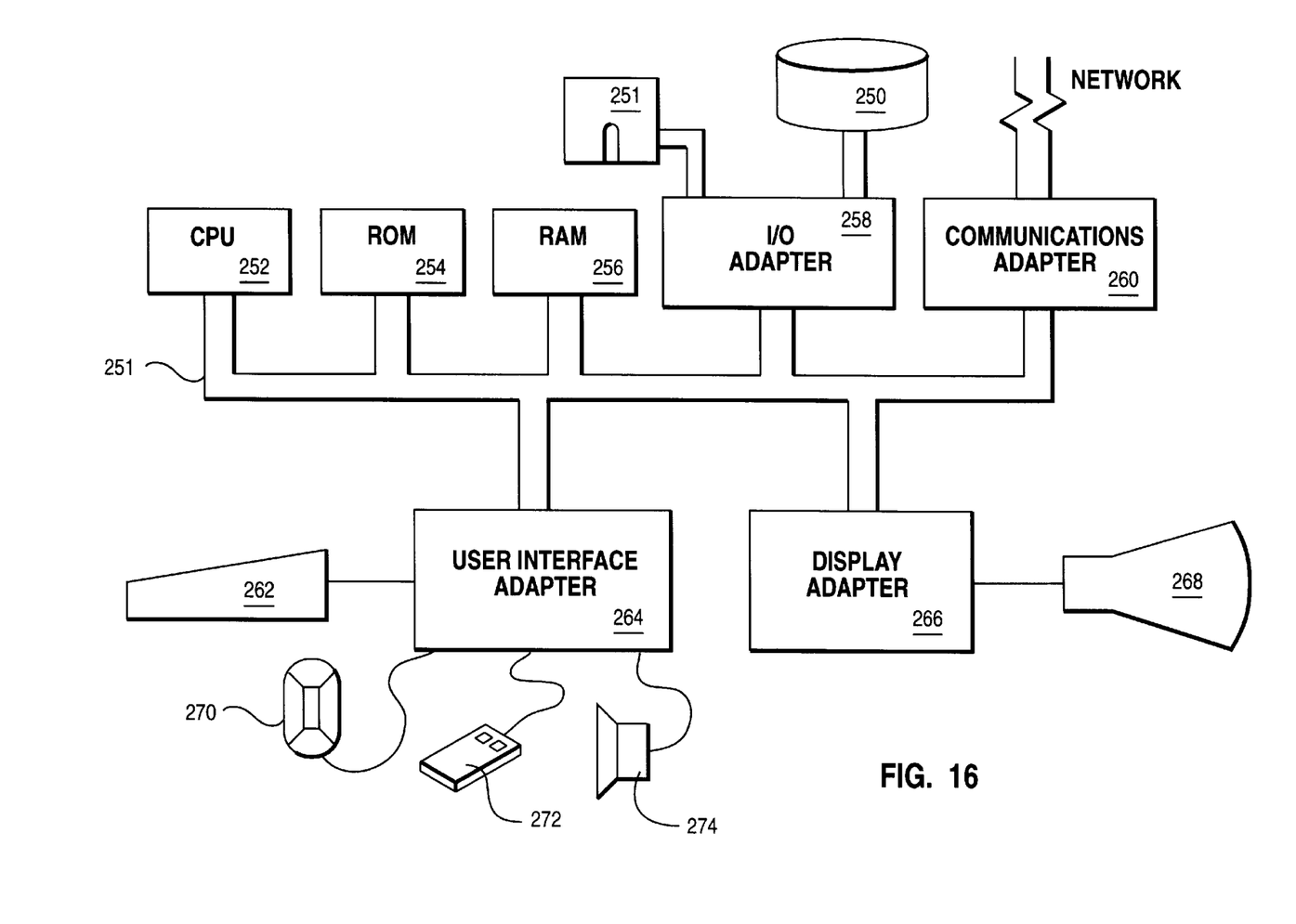
FIG. 16 is a block diagram representation of a computer/workstation where the invention may be practiced.

A representative hardware environment where this invention may be practiced is depicted in FIG. 16, which illustrates a workstation, having a central processing unit 252, such as a conventional microprocessor, and a number of other units interconnected via a system bus 251. The workstation shown in FIG. 16, includes a Random Access Memory (RAM) 256, Read Only Memory (ROM) 254, an I/O adapter 258 for connecting peripheral devices such as disk unit 250 to the bus, a user interface adapter 264 for connecting a keyboard 262, a mouse 272, a speaker 274, a microphone 270, and/or other user interface devices such as a touch screen device (not shown) to the bus, a communication adapter 260, for connecting the workstation to a data processing network and a display adapter 266, for connecting the bus to a display device 268. The workstation, in the preferred embodiment, has resident thereon the OS/2 operating system and the computer software making up this invention which is included as a toolkit. One skilled in the art will appreciate that the procedures of this invention may be in the form of a computer program product on a computer readable medium, which may be temporarily or permanently loaded on the workstation in disk storage 250, floppy diskette 251, or main memory 256.

While the invention has been described with respect to a preferred embodiment thereof, it will be understood by those skilled in the art that various changes in detail may be made therein without departing from the spirit, scope, and teaching of the invention. Accordingly, the herein disclosed invention is to be limited only as specified in the following claims.

What we claim is:

1. A method, implemented in a computer system, for saving and restoring persistent objects on persistent storage in a distributed object-oriented data processing system, comprising the steps of:

provinding a persistent object having a plurality of attributes including TypeCode information in a memory in said distributed object-oriented data processing system;

accessing said persistent object in said memory in said distributed object-oriented data processing system and invoking one of a plurality of methods having TypeCode encoding and decoding capability against said persistent object, and storing said plurality of attributes for said persistent object on said persistent storage as independent entries associated with said persistent object in response to said one of said methods based upon said TypeCode information while maintaining said plurality of attributes in said memory.

2. The method of claim 1, wherein the step of accessing said persistent object further includes the steps of:
   requesting a selected one of said plurality of attributes for said persistent object; and
   restoring said selected one of said attributes in response to said request based upon said TypeCode information.

3. The method of claim 1, wherein the step of accessing said persistent object further includes the steps of:
   changing a selected one of said plurality of attributes of said persistent object in said memory in said data processing system; and
   immediately updating said selected one of said plurality of attributes for said persistent object based upon said TypeCode information on said persistent storage to maintain synchronization between the persistent object in said memory and said persistent storage.

4. The method of claim 1, wherein the plurality of attributes is a plurality of instance variables.

5. The method of claim 1, wherein the persistence of said persistent object is not known by a client requesting said persistent object.

6. An apparatus for saving and restoring persistent objects on persistent storage in a distributed object-oriented data processing system, comprising:
   means for providing a persistent object having a plurality of attributes including TypeCode information in a memory in said distributed object-oriented data processing system;
   means for accessing said persistent object in said memory in said distributed object-oriented data processing system and means for invoking one of a plurality of methods having TypeCode encoding and decoding capability against said persistent object, and
   means for storing said plurality of attributes for said persistent object on said persistent storage as independent entries associated with said persistent object in response to said one of said methods based upon said TypeCode information while maintaining said plurality of attributes in said memory.

7. The apparatus of claim 6, wherein the means for accessing said persistent object further includes:
   means for requesting a selected one of said plurality of attributes for said persistent object; and
   means for restoring said selected one of said attributes in response to said request based upon said TypeCode information.

8. The apparatus of claim 6, wherein the means for accessing said persistent object further includes:
   means for changing a selected one of said plurality of attributes of said persistent object in said memory in said data processing system; and
   means for immediately updating said selected one of said plurality of attributes for said persistent object based upon said TypeCode information on said persistent storage to maintain synchronization between the persistent object in said memory and said persistent storage.

9. The apparatus of claim 6, wherein the plurality of attributes is a plurality of instance variables.

10. The apparatus of claim 6, wherein the persistence of said persistent object is not known by a client requesting said persistent object.

11. A computer program product having a computer readable medium having computer program logic recorded thereon for saving and restoring persistent objects on persistent storage in a distributed object-oriented data processing system, comprising:
    computer readable means for providing a persistent object having a plurality of attributes including TypeCode information in a memory in said distributed object-oriented data processing system;
    computer readable means for accessing said persistent object in said memory in said distributed object-oriented data processing system and invoking one of a plurality of methods having TypeCode encoding and decoding capability against said persistent object, and
    computer readable means for storing said
    plurality of attributes for said persistent object on said persistent storage as independent entries associated with said persistent object in response to said one of said methods based upon said TypeCode information while maintaining said plurality of attributes in said memory.

12. The computer program of claim 11, comprising:
    computer readable means for requesting a selected one of said plurality of attributes for said persistent object; and
    computer readable means for restoring said selected one of said attributes in response to said request based upon said TypeCode information.

13. The computer program of claim 11, comprising:
    computer readable means for changing a selected one of said plurality of attributes of said persistent object in said memory in said data processing system; and
    computer readable means for immediately updating said selected one of said plurality of attributes for said persistent object based upon said TypeCode information on said persistent storage to maintain synchronization between the persistent object in said memory and said persistent storage.

* * * * *